72906  John W. Richardson's
Imp'd Mitre Box.
PATENTED
DEC 31 1867
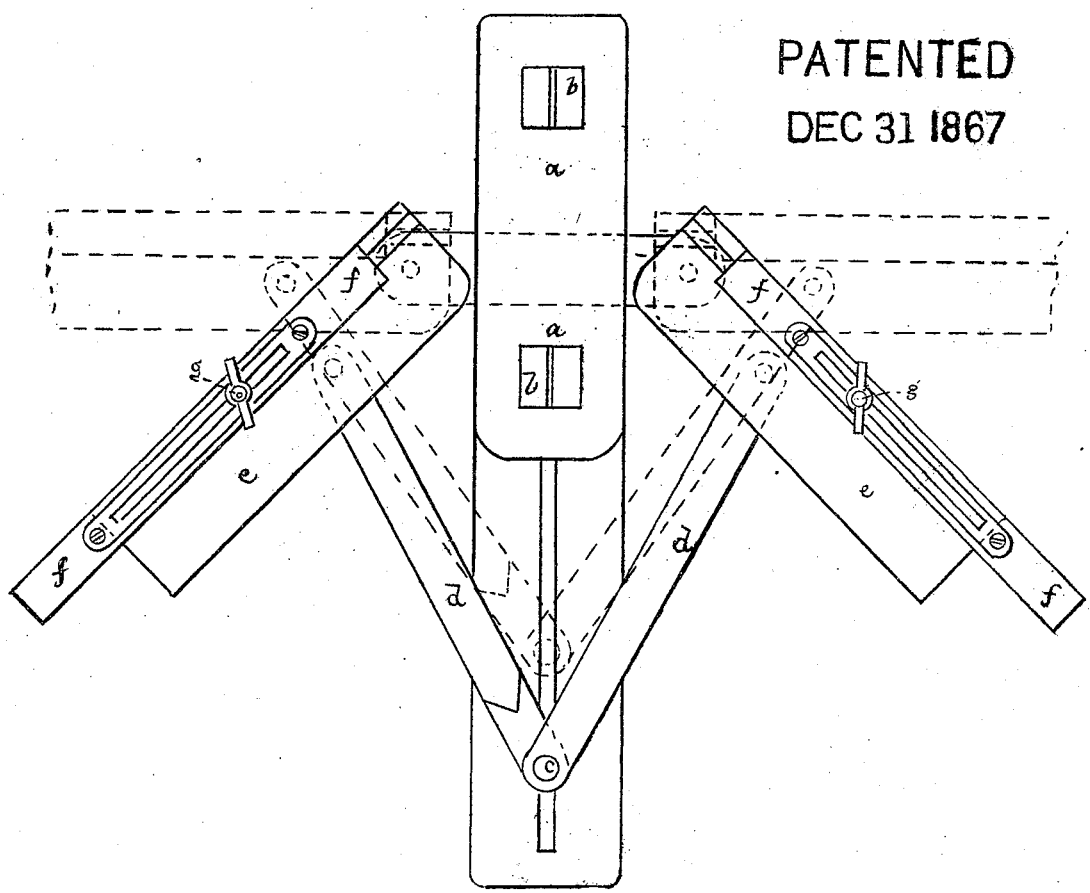
Witnesses
S. B. Kidder
M. W. Frothingham
J W Richardson
Crosby Halstead &
Att'ys

United States Patent Office.

JOHN W. RICHARDSON, OF BOSTON, MASSACHUSETTS.

Letters Patent No. 72,906, dated December 31, 1867.

IMPROVEMENT IN MITRE-BOX.

The Schedule referred to in these Letters Patent and making part of the same.

TO ALL WHOM IT MAY CONCERN:

Be it known that I, JOHN W. RICHARDSON, of Boston, in the county of Suffolk, and State of Massachusetts, have invented a new and improved Mitre-Box; and I do hereby declare that the following, taken in connection with the drawings which accompany and form part of this specification, is a description of my invention sufficient to enable those skilled in the art to practise it.

This mitre-box is so constructed as to be applicable to the sawing of angles generally, as well as to the sawing of mitres or angles of forty-five degrees, and is designed for use by all wood-workers, and by ship-carpenters and joiners especially, the work by the last-named artizans being rarely square, and nearly always angular or bevelling.

My invention consists in combining with the base, in which the saw kerf-posts are set, opposite movable wings for stock-guides and supports, so connected with each other that movement of one guide shall cause corresponding movement of the opposite guide, and so connected with the piece in which the saw guide-posts are set, or a continuation thereof, as that the stock-guides may be fastened immovably with respect to said piece, and with respect to each other, and at any desired angle with the plane of the movement of the saw.

The drawing illustrates, in plan, an embodiment of my invention, exhibiting the parts in two different positions, the lines in red showing the stock-guides in that position in which the saw will cut square or at an angle of ninety degrees, with reference to them, while the other position shown is that in which the saw will cut the stock on a mitre or angle of forty-five degrees.

$a$ is the base or main centre-piece of the apparatus, in which are fixed the saw guide-posts $b$, the centre-piece $a$ being an extension to the rear, which is centrally and longitudinally slotted to receive the screw clamp-pin $c$, which operates to bind anywhere in the slot one end of each of the links $d$. The stock-guides are each made up of two pieces, one of which has its upper surface in the same plane with the upper surface of $a$, between the saw guide-posts, while the other piece, $f$, forms a right angle with the surface of $e$, and is arranged to slide thereon, when needed, toward and from the plane in which the saw moves, the pieces $f$ and $e$ being confined together by screws and nuts at $g$. The stock-guides may be pivoted to the piece $a$ in any suitable way, for example, as shown in the drawings, or the pivotal point may be common to both stock-guides, and located in the piece $a$, with its axis in the plane, passing through the saw-kerf in both posts $b$. The links are of equal length, and are each pivoted to one of the stock-guides, at the same distance from the pivot or pivots on which the stock-guides swing. Consequently, the movement of the guides, and the angles which they form with respect to the line of the saw, must be similar each to the other.

The object of the provision for moving the pieces $f$ on the pieces $e$ is to support the stock under the action of the saw, at greater or less distances from the plane of the saw's movement, as may be desired. When desired, the saw guide-posts may be shifted towards or from each other, suitable holes or mortises being made in $a$ for that purpose, or may be changed for other posts having therein finer or coarser saw-kerfs.

I claim a mitre-box, constructed by combining with the piece sustaining the saw guide-posts, stock-guides separately pivoted, so as to be turned each on its own centre with respect to said piece, and arranged to be held thereto, and adjusted by means of pivoted links, all substantially as set forth.

JOHN W. RICHARDSON.

Witnesses:
J. B. CROSBY,
FRANCIS GOULD.